(12) United States Patent
Jiang et al.

(10) Patent No.: US 10,971,706 B2
(45) Date of Patent: Apr. 6, 2021

(54) ELECTRODE ASSEMBLY

(71) Applicant: Ningde Amperex Technology Limited, Fujian (CN)

(72) Inventors: Jing Jiang, Fujian (CN); Kefei Wang, Fujian (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 149 days.

(21) Appl. No.: 16/175,883

(22) Filed: Oct. 31, 2018

(65) Prior Publication Data
US 2019/0165339 A1    May 30, 2019

(30) Foreign Application Priority Data

Nov. 29, 2017  (CN) .......................... 201721631032.7

(51) Int. Cl.
*H01M 2/02*    (2006.01)
*H01M 2/32*    (2006.01)
*H01M 4/62*    (2006.01)
*H01M 4/13*    (2010.01)
*H01M 2/10*    (2006.01)
*H01M 10/04*   (2006.01)
*H01M 4/02*    (2006.01)

(52) U.S. Cl.
CPC ......... *H01M 2/0275* (2013.01); *H01M 2/029* (2013.01); *H01M 2/0277* (2013.01); *H01M 2/0285* (2013.01); *H01M 2/1094* (2013.01); *H01M 2/32* (2013.01); *H01M 4/13* (2013.01); *H01M 4/622* (2013.01); *H01M 10/0431* (2013.01); *H01M 2004/027* (2013.01)

(58) Field of Classification Search
CPC ............. H01M 2/0275; H01M 2/0277; H01M 10/0431; H01M 2/029; H01M 2/0285; H01M 2/32; H01M 4/622; H01M 4/13; H01M 2/1094; H01M 2004/027
USPC ........................................................ 429/176
See application file for complete search history.

(56) References Cited

U.S. PATENT DOCUMENTS

2011/0159344 A1*  6/2011  Kobayashi .............. H01M 4/62
                                                  429/130

* cited by examiner

*Primary Examiner* — Gary D Harris
(74) *Attorney, Agent, or Firm* — Morgan, Lewis & Bockius LLP

(57) ABSTRACT

The present application relates to an electrode assembly and a secondary battery. The electrode assembly includes a cell and a protective layer. The cell includes a cell body and an electrode tab protruding from a top surface of the cell body. In a length direction of the cell, at least one end of the protective layer extends beyond the height at which the anode electrode in the cell body protrudes at the end, and the extended dimension is no more than 3 mm. As such, the burr of the anode electrode of the cell body is wrapped by the protective layer, which alleviates the phenomenon that the burr on the anode electrode pierces the package bag and chemically reacts with the aluminum layer of the package bag, thereby reducing the risk of leakage of the package bag.

15 Claims, 4 Drawing Sheets

ELECTRODE ASSEMBLY

CROSS-REFERENCE TO RELATED APPLICATION

This application claims priority to and the benefit of Chinese Patent Application Serial No. 201721631032.7, filed with the China National Intellectual Property Administration on Nov. 29, 2017, and the entire content of which is incorporated herein by reference.

FIELD OF THE APPLICATION

The present application relates to the field of energy storage device technologies, in particular, to an electrode assembly and a secondary battery.

BACKGROUND OF THE APPLICATION

With the development of science and technology, various electronic products emerge in an endless stream and become an indispensable part of daily life. Since secondary batteries, such as lithium-ion batteries, have advantages of high energy density, long cycle life, environmental friendliness and reproducibility, they have been widely used in various electronic products.

In the related art, the secondary battery generally achieves isolation between the current collector and the aluminum plastic film through a separator. As the requirement for the energy density of the secondary battery is becoming higher with the time, the thicknesses of the separator, the aluminum plastic film, and the current collector are also reduced. On the one hand, the thinned collector current is prone to become a sharp corner at both side edges in the width direction when the battery core is formed after pressing, and the sharp corner increases the possibility that the current collector pierces the aluminum plastic film. On the other hand, there is a burr on the die-cut surface of the anode current collector. When the burr pierces the aluminum plastic film, the anode copper foil is in contact with the aluminum layer in the aluminum plastic film, and then a chemical reaction causes corrosion of the portion. In severe cases, leakage phenomenon occurs in the aluminum plastic film.

SUMMARY OF THE APPLICATION

Embodiments of the present application provide an electrode assembly and a secondary battery, which may reduce the risk of package bag leakage.

The first aspect of the present application provides an electrode assembly including a cell and a protective layer, the cell includes a cell body and an electrode tab protruding from the cell body.

In a height direction of the cell, at least one end of the protective layer extends beyond an anode electrode in the cell body, and the extending dimension is no more than 3 mm.

Preferably, in a width direction of the cell, the protective layer is disposed on both sides of the cell; in a height direction of the cell, both ends of the protective layer extend beyond the anode electrode.

Preferably, on at least one side in the width direction of the cell body, the protective layer extends in a height direction of the cell to extend beyond the height at which the anode electrode of the cell body protrudes at both ends.

Preferably, the anode electrode of the cell body includes a top portion and a bottom portion distributed along the height direction of the cell, and the protective layer includes a first portion and a second portion; on at least one side of the width direction of the cell body, the first portion covers the top portion, the second portion covers the bottom portion, and a gap is defined between the first portion and the second portion.

Preferably, on at least one side in the width direction of the cell body, the protective layer covers the outermost surface of the cell body.

Preferably, the cell body includes a wound cell body, and the wound cell body includes a body portion containing an active material and an empty foil region at a finishing end of the body portion; the protective layer covers at least one side of the width direction of the cell body and is arranged in the empty foil region of the first layer from outside.

Preferably, the protective layer includes a first binding sub-layer and an isolation sub-layer laminated together, and the protective layer is bound to the cell through the first binding sub-layer.

Preferably, the protective layer further includes a second binding sub-layer, and the second binding sub-layer is arranged on a side of the isolation sub-layer away from the first binding sub-layer.

Preferably, the isolation sub-layer includes a layer made of at least one selected from the group consisting of polyolefin, polyacrylonitrile, polyol ester, polyamide, polyurethane, and a composite containing at least one of polyolefin, polyacrylonitrile, polyol ester, polyamide and polyurethane.

The first binding sub-layer and/or the second binding sub-layer includes a layer formed of at least one of:

polyolefin, polyurethane, polyacrylate, silicone, rubber, and a composite containing at least one of polyolefin, polyurethane, polyacrylate, silicone, and rubber.

Preferably, a thickness of the protective layer ranges from 3 um to 40 um.

The second aspect of the present application provides a secondary battery including a package bag and at least one electrode assembly packaged in the package bag, and each electrode assembly is the electrode assembly according to any one of the above.

The technical solution provided by the present application may achieve the following beneficial effects:

The present application provides an electrode assembly including a protective layer arranged on at least one side in the width direction of the cell body and extending respectively from this side to a first surface and a second surface; in the height direction of the cell, at least one end of the protective layer extends beyond the height at which the anode electrode in the cell body protrudes at the end, and the extended dimension is no more than 3 mm. After this arrangement, on one hand, the burr of the anode electrode of the cell body is wrapped by the protective layer, which alleviates the phenomenon that the burr on the anode electrode pierces the package bag and chemically reacts with the aluminum layer of the package bag, thereby reducing the risk of leakage of the package bag; on the other hand, at least one sharp corner on the cell body is well covered by the protective layer, so that the piercing force applied to the package bag at the sharp corner can be absorbed partially by the protective layer, and correspondingly, the risk of leakage due to piercing of the package bag by the sharp corner is reduced.

The above general description and the following detailed description are merely exemplary and are not intended to be limiting.

BRIEF DESCRIPTION OF THE ACCOMPANYING DRAWINGS

Figure 1:
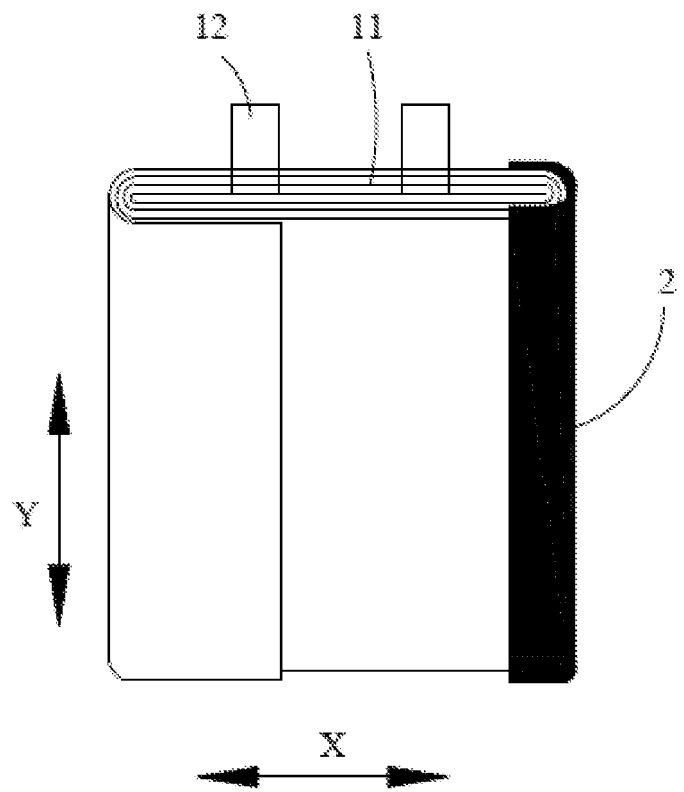
FIG. 1 is a schematic diagram of Example 1 wherein a protective layer is provided on a cell, according to an embodiment of the present application.

The drawings herein are incorporated in and constitute a part of the specification. Embodiments consistent with the present application are shown and used in conjunction with the specification to explain the principles of the application.

DETAILED DESCRIPTION OF THE PREFERRED EXAMPLES

The present application will be further described in detail below through the specific embodiments and the accompanying drawings.

As shown in FIGS. 1-4, the first aspect of the present application provides an electrode assembly including a cell 1. The cell 1 may be processed by laminating or winding an anode electrode, a cathode electrode, and a separator arranged between the anode electrode and the cathode electrode. Among them, the anode electrode is separated from the cathode electrode by the separator to prevent contact or conduction between the two.

The cell 1 includes a cell body 11 and an electrode tab 12 protruding from the cell body 11. The cell body 11 is used to store electric energy, and the electrode tab 12 is used to connect to an external circuit to output electric energy in the cell body 11 to the outside.

In the present application, In order to reduce the risk of leakage of the package bag 3, the electrode assembly further includes a protective layer 2. The protective layer 2 covers at least one side of the width direction of the cell body 11. In the height direction of the cell 1, at least one end of the protective layer 2 extends beyond the height at which the anode electrode in the cell body 11 protrudes at the end, and the extended dimension is no more than 3 mm. The term "width direction of the cell body 11" as used herein is the width direction of the cell 1, specifically, refers to a direction perpendicular to the protruding direction of the electrode tab 12 in a two-dimensional plane, i.e. the direction X shown in FIG. 1. The term "height direction of the cell 1" as used herein specifically refers to the protruding direction of the electrode tab 12, i.e., the direction Y shown in FIG. 1.

According to the above description, by providing the protective layer 2 on the anode electrode of the cell body 11, on the one hand, the burrs on the anode electrode are wrapped, thereby reducing the risk of the package bag 3 being pierced by the burrs on the anode electrode, and at the same time, the risk of corrosion due to forming reaction between the anode copper foil and the aluminum layer in the package bag 3 is reduced, so that the risk of leakage of the package bag 3 is reduced; on the other hand, since the groove of the cell body 11 is required to be punched in the package bag 3, both sides of the package bag 3 corresponding to the width direction of the cell body 11 become weaker after being drawn. As such, at least one sharp corner on the cell body 1 may be well covered by the protective layer 2, so that the piercing force of the sharp corner applied to the package bag 3 at the sharp corner may be absorbed partially by the protective layer 2, and correspondingly, the risk of leakage due to piercing of the package bag 3 by the sharp corner is reduced.

It should be noted that the protective layer 2 may be not arranged on both sides in the thickness direction of the cell body 11, because the cell body 11 requires to be hot-pressed by the press-fitting mechanism after being wound or stacked. Therefore, in the thickness direction of the cell body 11, the burrs are flattened, which causes the risk of leakage of the package bag 3 to be small. In addition, since the gap between the top portion and bottom portion of the cell body 11 in the height direction and the package bag 3 is large, the top portion and bottom portion are less in contact with the package bag 3, and so the risk of leakage of the package bag 3 in these two parts is also relatively small. Thus, in the present application, only the protective layer 2 is arranged on at least one side of the width direction of the cell body 11.

Further, in order to further reduce the risk of leakage of the package bag 3, it is preferable to provide the protective layer 2 on both sides in the width direction of the cell body 11. As a result, most of the burrs on the cell 1 may be covered by the protective layer 2, thereby further reducing the risk of leakage of the package bag 3.

Moreover, on both sides in the width direction of the cell body 11, in the height direction of the cell 1, both ends of the protective layer 2 may respectively further extend beyond the height at which the anode electrode of the cell body 11 protrudes at both ends. It can be seen that the burrs at both ends of the anode electrode are wrapped on both sides in the width direction of the cell 1, and the risk of leakage of the package bag 3 is further reduced. Correspondingly, the sharp corners of the cell 1 are all wrapped by the protective layer 2, and the sharpness at each sharp corner is controlled, and the risk of leakage after the package bag 3 is pierced is greatly reduced.

In the various embodiments described above, the manner in which the protective layer 2 is arranged is not unique. In an embodiment, as shown in FIG. 1, on at least one side in the width direction of the cell body 11, the protective layer 2 extends in the height direction of the cell 1 beyond the height at which the anode electrode of the cell body 11 protrudes at both ends. In this case, the protective layer 2 on one side of the cell body 11 may be arranged in a one-piece structure, i.e., the protective layer 2 extends in the height of the cell 1 with both ends respectively covering the top portion and bottom portion of the anode electrode of the cell body 11, an intermediate portion covering the middle of the cell 1, so that this side of the cell body 11 is entirely covered. This solution makes the processing and arrangement of the protective layer 2 relatively simple.

Figure 2:
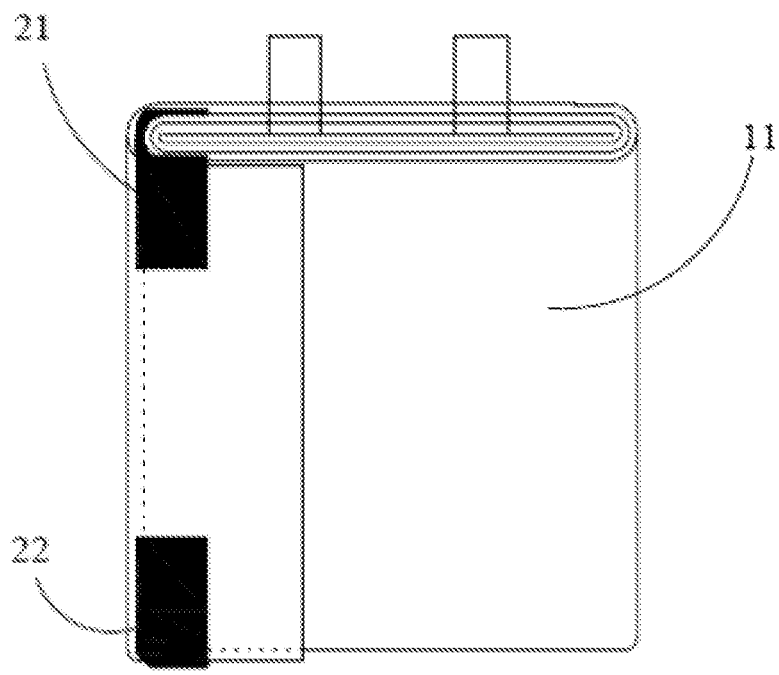
FIG. 2 is a schematic diagram of Example 2 wherein a protective layer is provided on a cell, according to an embodiment of the present application.

In another embodiment, as shown in FIG. 2, the anode electrode of the cell body 11 includes a top portion and a bottom portion distributed in the height direction of the cell 1, and correspondingly the protective layer 2 includes a first portion 21 and a second portion 22. On at least one side in the width direction of the cell body 11, the first portion 21 covers the top portion, the second portion 22 covers the bottom portion, and there is a gap between the first portion 21 and the second portion 22. In this solution, the protective layer 2 is arranged as a split structure, which includes two portions, and a gap is left between the two portions. It is considered that sharp corners and burrs are mainly formed at both ends in the height direction of the cell 1, but rarely appear in the middle; the omission of the protective layer 2 in the middle of the cell body 11 may reduce the space occupied by the protective layer 2.

In the above two embodiments, the manner in which the protective layer 2 is arranged may be selected depending on the specific application environment of the electrode assembly.

The same arrangement may be used for stacked cell or wound cell. For example, on at least one side in the width direction of the cell body 11, the protective layer 2 may cover the outermost surface of the cell body 11, as shown in FIG. 1. As such, the protective layer 2 is arranged at the outermost side of the cell body 11 and located between the cell body 11 and the package bag 3. This solution may be used to arrange the protective layer 2 after the cell 1 is processed. Compared with the arrangement of the protective layer 2 during the processing of the cell 1, the former arrangement is simpler.

Figure 3:
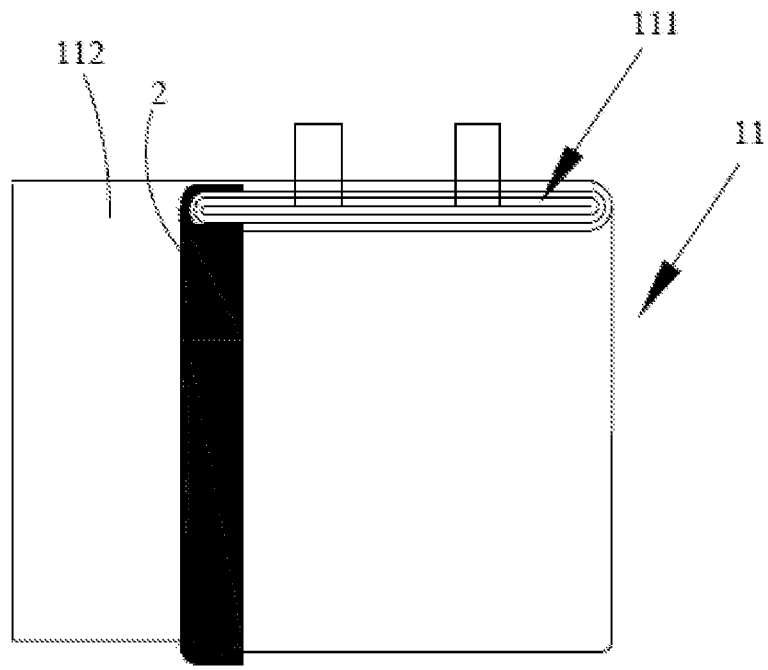
FIG. 3 is a schematic diagram showing that the wound cell body is not wound up, according to an embodiment of the present application.
Figure 4:
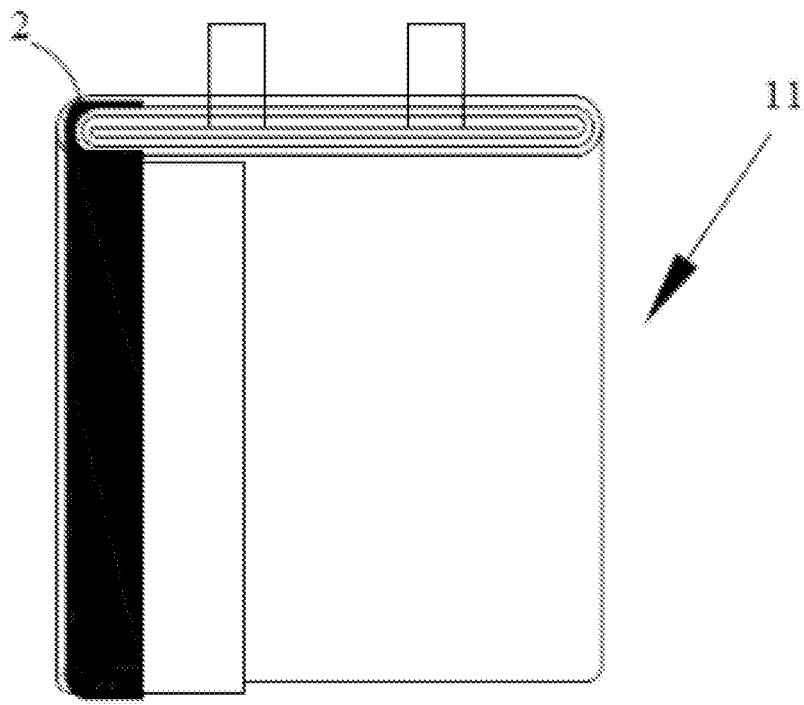
FIG. 4 is a schematic diagram showing that the wound cell body is wound up, according to an embodiment of the present application.

In particular, as shown in FIGS. 3 to 4, for the wound cell, since the cell 1 is subjected to a winding process, the processed cell body 11 is a wound structure, wherein the wound cell body 11 includes a body portion 111 containing an active material and an empty foil region 112 at the finishing end of the body portion 111. In this case, the protective layer 2 may cover at least one side in the width direction of the cell body 11 and located in the empty foil region 112 of the first layer from outside. From this, it is understood that the protective layer 2 is wound inside the cell body 11, and the protective layer 2 is not easily separated from the cell body 11 due to the winding force while having a high stability. It is also easy to understand that by increasing the number of the protective layers 2 arranged in the empty foil region 112 or increasing the length of the protective layer 2, the protective layer 2 may cover both sides in the width direction of the cell body 11.

In embodiments shown in FIGS. 3 to 4, the protective layer 2 may be arranged in the empty foil region 112 of the first layer from outside in two ways. On way is to arrange the protective layer 2 on the inner wall of the empty foil region 112 of the first layer from outside. Another way is to arrange the protective layer 2 on the outer wall of the empty foil region 112 of the second layer from outside. When wound in the above two ways, the protective layer 2 may be arranged between the first layer and the second layer of the wound battery core from outside, and is located on at least one side in the width direction of the cell body 11.

Figure 5:
FIG. 5 is a schematic diagram of Example 1 of a protective layer, according to an embodiment of the present application.

As shown in FIG. 5, in order to further ensure the stability of the position of the protective layer 2 with respect to the cell body 11, the protective layer 2 preferably includes a first binding sub-layer 2a and an isolation sub-layer 2b which are laminated, and the protective layer 2 is bound to the cell 1 through the first binding sub-layer 2a, and the isolation sub-layer 2b is used to contact the sharp corners and burrs of the cell body 11, to isolate the cell body 11 and the package bag 3. The first binding sub-layer 2a is arranged to fix the protective layer 2 by adhesive force, and the fixing way is simple and reliable.

Figure 6:
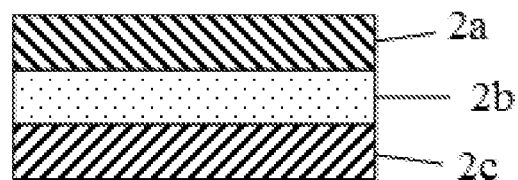
FIG. 6 is a schematic diagram of Example 2 of a protective layer, according to an embodiment of the present application.

Further, as shown in FIG. 6, the protective layer 2 further includes a second binding sub-layer 2c. The second binding sub-layer 2c is arranged on the side of the isolation sub-layer 2b away from the first binding sub-layer 2a. The second binding sub-layer 2c is arranged such that both sides of the protective layer 2 may be bound to other objects, so that the fixing reliability of the protective layer 2 is higher. For example, when the protective layer 2 is arranged in the wound cell body 11, the protective layer 2 may be bound to the inner wall of the empty foil region 112 through the first binding sub-layer 2a, and bound to the second layer of the cell body 11 from outside through the second binding sub-layer 2c, to ensure that the protective layer 2 may be reliably fixed in the wound cell body 11. Of course, for the embodiment in which the protective layer 2 is arranged on the outermost surface of the cell body 11, the two binding sub-layers may be bound to the cell body 11 and the package bag 3, respectively.

As previously mentioned, the isolation sub-layer 2b is used to separate the cell body 11 from the package bag 3, for which purpose the isolation sub-layer 2b may preferably include a layer formed of at least one of polyolefin, polyacrylonitrile, polyol ester, polyamide, polyurethane, and a composite containing at least one of polyolefin, polyacrylonitrile, polyol ester, polyamide and polyurethane. The above materials are all polymer materials, which have good mechanical properties and electrical insulation properties, and have high chemical stability.

In addition, the first binding sub-layer 2a and/or the second binding sub-layer 2c may preferably include a layer formed of at least one of polyolefin, polyurethane, polyacrylate, silicone, rubber, and a composite containing at least one of polyolefin, polyurethane, polyacrylate, silicone, and rubber. The above materials have good permeability and high adhesive strength after polymerization.

It should be noted that the materials used for each of the isolation sub-layer 2b, the first binding sub-layer 2a, and the second binding sub-layer 2c are not limited to those described above, and in other embodiments, the above three may have other arrangements.

In addition, in order to reduce the space occupied by the protective layer 2, the range of the thickness of the protective layer 2 may be set to 3 um to 40 um.

Figure 7:
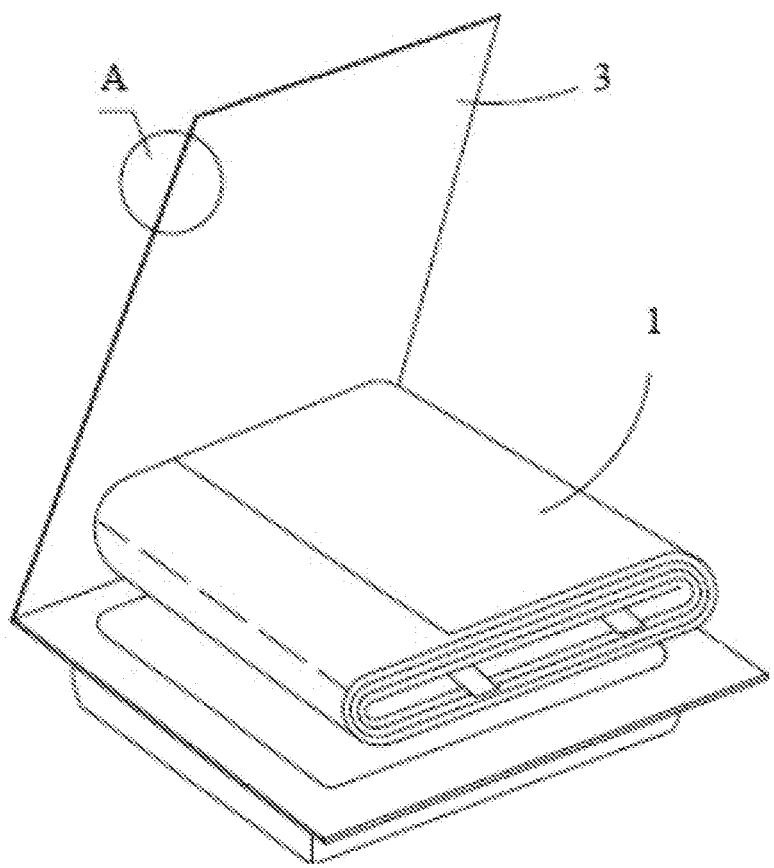
FIG. 7 is a schematic diagram of a secondary battery provided by an embodiment of the present application.

As shown in FIG. 7, the second aspect of the present application further provides a secondary battery including a package bag 3 and at least one electrode assembly packaged in the package bag 3, and each of the electrode assemblies is the electrode assembly according to any one of the above embodiments.

Figure 8:
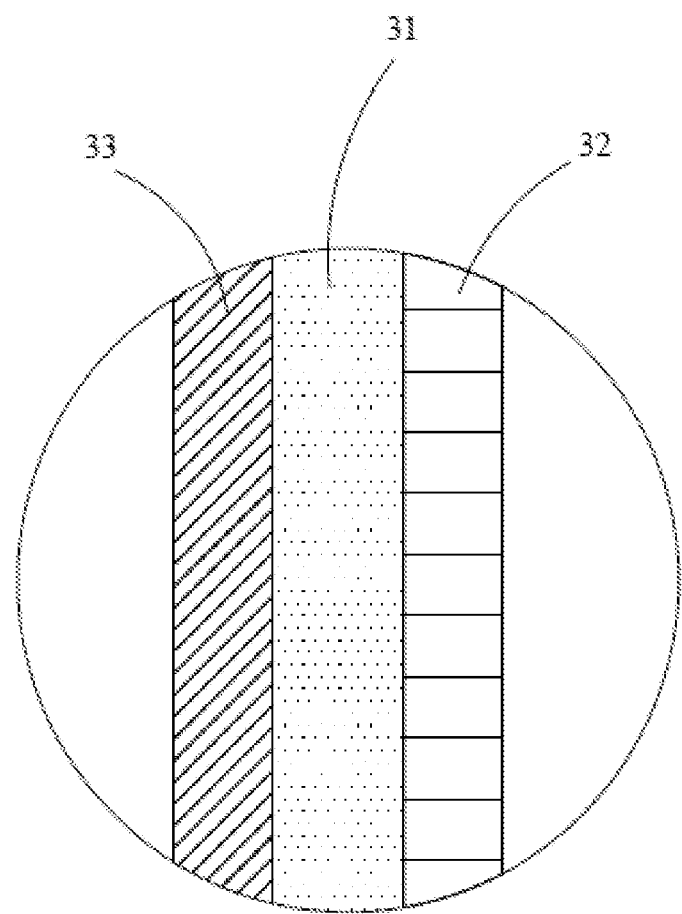
FIG. 8 is an enlarged view of the A portion of FIG. 7.

As shown in FIG. 8, the package bag 3 is usually of a multi-layer structure, that is, with an intermediate layer 31 and a first insulating layer 32 and a second insulating layer 33 on both sides of the intermediate layer 31, wherein in order to increase the strength of the package bag 3, the intermediate layer 31 is preferably arranged as a metal layer such as aluminum or steel, and the first insulating layer 32 and the second insulating layer 33 are arranged as a polypropylene layer or an ethylene-acrylic copolymer layer or the like.

The foregoing is merely illustrative of the preferred embodiments of the present application and is not intended to be limiting of the present application, and various changes and modifications may be made by those skilled in the art. Any modifications, equivalent substitutions, improvements, and the like within the spirit and principles of the application are intended to be included within the scope of the present application.

What is claimed is:

1. An electrode assembly, comprising:
a cell; and
a protective layer;
wherein the cell comprises a cell body and an electrode tab protruding from the cell body;
wherein in a height direction of the cell, at least one end of the protective layer extends beyond an anode electrode, and the extended dimension is no more than 3 mm; and
wherein the protective layer comprises a first binding sub-layer and an isolation sub-layer which are laminated, and the protective layer is bound to the cell through the first binding sub-layer.

2. The electrode assembly according to claim 1, wherein in a width direction of the cell, the protective layer is disposed on both sides of the cell; in a height direction of the cell, both ends of the protective layer extend beyond the anode electrode.

3. The electrode assembly according to claim 1, wherein the anode electrode comprises a top portion and a bottom portion distributed along the height direction of the cell body, and the protective layer comprises a first portion and a second portion;
on at least one side of the width direction of the cell body, the first portion covers the top portion, and the second portion covers the bottom portion, and there is a gap between the first portion and the second portion.

4. The electrode assembly according to claim 1, wherein on at least one side in the width direction of the cell body, the protective layer covers the outermost surface of the cell body.

5. The electrode assembly according to claim 1, wherein the cell body comprises a wound cell body, the wound cell body comprising a body portion containing an active material and an empty foil region at a finishing end of the body portion;
the protective layer covers at least one side of the width direction of the cell body and is arranged in the empty foil region of the first layer from outside.

6. The electrode assembly according to claim 1, wherein the protective layer further comprises a second binding sub-layer, and the second binding sub-layer is arranged on a side of the isolation sub-layer away from the first binding sub-layer.

7. The electrode assembly according to claim 6, wherein the isolation sub-layer comprises a layer made of at least one selected from the group consisting of polyolefin, polyacrylonitrile, polyol ester, polyamide, polyurethane, and a composite containing at least one of polyolefin, polyacrylonitrile, polyol ester, polyamide and polyurethane;
the first binding sub-layer and/or the second binding sub-layer comprise a layer made of at least one selected from the group consisting of polyolefin, polyurethane, polyacrylate, silicone, rubber, and a composite containing at least one of polyolefin, polyurethane, polyacrylate, silicone, and rubber.

8. The electrode assembly according to claim 1, wherein a thickness of the protective layer ranging from 3 um to 40 um.

9. The electrode assembly according to claim 2, wherein a thickness of the protective layer ranging from 3 um to 40 um.

10. The electrode assembly according to claim 3, wherein a thickness of the protective layer ranging from 3 um to 40 um.

11. The electrode assembly according to claim 4, wherein a thickness of the protective layer ranging from 3 um to 40 um.

12. The electrode assembly according to claim 5, wherein a thickness of the protective layer ranging from 3 um to 40 um.

13. A secondary battery, comprising:
a package bag and
at least one electrode assembly packaged in the package bag, wherein each of the at least one electrode assembly comprises:
a cell; and
a protective layer;
wherein the cell comprises a cell body and an electrode tab protruding from the cell body;
wherein in a height direction of the cell, at least one end of the protective layer extends beyond an anode electrode, and the extended dimension is no more than 3 mm;
wherein the protective layer comprises a first binding sub-layer and an isolation sub-layer which are laminated, and the protective layer is bound to the cell through the first binding sub-layer.

14. The secondary battery according to claim 13, wherein on at least one side in the width direction of the cell body, the protective layer extends in a height direction of the cell to extend beyond the height at which the anode electrode of the cell body protrudes at both ends.

15. The secondary battery according to claim 13, wherein the anode electrode comprises a top portion and a bottom portion distributed along the height direction of the cell body, and the protective layer comprises a first portion and a second portion;
on at least one side of the width direction of the cell body, the first portion covers the top portion, and the second portion covers the bottom portion, and there is a gap between the first portion and the second portion.

* * * * *